United States Patent [19]
Tailhardat

[11] 3,910,098
[45] Oct. 7, 1975

[54] MANDREL FOR SHAPING PIPES
[75] Inventor: Franck Tailhardat, Chamalieres, France
[73] Assignee: Pneumatiques, Caoutchouc Manufacture et Plastiques Kleber-Colombes, France
[22] Filed: Oct. 17, 1974
[21] Appl. No.: 515,525

[30] Foreign Application Priority Data
Oct. 17, 1973 France............... 73.37152

[52] U.S. Cl................................. 72/466; 269/48.1
[51] Int. Cl.².......................................... B21D 9/01
[58] Field of Search................ 72/465, 466, 479; 269/48.1; 156/143

[56] References Cited
UNITED STATES PATENTS
| | | | |
|---|---|---|---|
| 2,446,281 | 8/1948 | Harding | 269/48.1 |
| 2,568,848 | 9/1951 | Enabnit | 156/143 |
| 3,180,130 | 4/1965 | Avera | 72/465 |
| 3,825,167 | 7/1974 | Komorek et al. | 269/48.1 |
| 3,834,169 | 9/1974 | Abbott | 269/48.1 |

FOREIGN PATENTS OR APPLICATIONS
201,804   5/1956   Australia............... 72/466

Primary Examiner—Lowell A. Larson
Attorney, Agent, or Firm—Craig & Antonelli

[57] ABSTRACT
An expansible mandrel for shaping large-diameter metal pipes used, for example, to convey petroleum products which includes the combination of an expansible central tube having a rubber wall braced with at least one pair of layers comprising metal wires or cables crossed from one layer to the other and inclined at an angle under 55° and preferably comprised between 10° and 45° to the longitudinal axis of the tube and a cylindrical thick rubber sleeve arranged around the tube, said sleeve being externally covered with flexible longitudinal plates adhering to the rubber of the sleeve.

6 Claims, 6 Drawing Figures

MANDREL FOR SHAPING PIPES

BACKGROUND OF THE INVENTION

1. Field of the Invention

The present invention relates to expansible mandrels used to shape, i.e. to curve or bend, large-diameter metal pipes used for conveying petroleum products (oil or gas lines) or other fluids. This type of mandrel is introduced into the part of the pipe to be shaped so as to form a sufficiently rigid internal support to prevent the walls of the pipe from wrinkling or becoming oval-shaped during the shaping operation.

2. Description of the Prior Art

To shape pipes having a diameter of about 15 – 50 cm., it has hitherto been possible to use expansible mandrels consisting essentially of a section of rubber tubing closed at each end and capable of being inflated with air or a liquid so as to be applied firmly against the internal surface of the pipe to be shaped. In the case of pipelines having larger diameters (that is from 50 to 90 or even 120 cm), these flexible, inflatable mandrels could not be used as they were incapable of withstanding the inflation pressures which would have been required to efficiently support the walls of the pipes to be curved into shape. It was therefore necessary to design and employ mechanical mandrels comprising a plurality of groups of jacks radially pushing against plates resting on the walls of the pipeline so as to support them during the shaping operation. This mechanical mandrel system is extremely complicated, costly and fragile for use on construction sites where it is obviously desirable to have hard-wearing, strong equipment.

In addition, in the field of "pipeline" construction, the tendency is now to use large-diameter metal pipes having highly resistant thin steel walls so as to provide relatively lighter pipeline sections. However, it is more difficult to shape pipes of this type and in order to avoid defects due to wrinkling of the walls, it is necessary to produce mandrels capable of exerting even greater pressures on the walls of the pipes. The known type of mandrels described above are thus incapable of exerting such pressures.

SUMMARY OF THE INVENTION

The object of the present invention is thus to eliminate or reduce the above-mentioned disadvantages and to provide expansible shaping mandrels capable of bearing on and transmitting to the walls of pipes to be shaped the very high pressures required for efficiently supporting these walls and preventing their deformation during the shaping operation. Another object of the present invention is to provide mandrels of simple, economic and strong construction, enabling the mandrels to be used under the harsh conditions encountered on oil and gas line construction sites.

Generally speaking, the shaping mandrels according to the present invention comprise a central expansible rubber tube comprising rubber walls reinforced with at least one pair of bracing layers consisting of metal cables crossed from one layer to the other and being inclined at an angle of 10° – 45° with respect to the longitudinal axis of the tube and a cylindrical, thick rubber sleeve covered externally with flexible longitudinal extending plates adhering to the sleeve. According to the present invention, the sleeve also has embedded within the thickness of its wall construction, at least one pair of reinforcing layers consisting of metal cables oriented at cross-directions with each other and forming a slightly smaller angle than the angle of the inner bracing layers of the expansible tube.

The thick cylindrical sleeve may be removable with respect to the central expansible tube. Alternatively, it may be connected to this tube and form an integral part therewith. In either case, this rubber sleeve expands and contracts simultaneously with the central tube and it is capable of transmitting to the pipeline wall the high pressure which can be used to inflate this central tube owing to its wire or cable bracing layers.

Other objects, features and advantages of the present invention will be made apparent from the following description of a preferred embodiment thereof and with reference to the accompanying drawings, wherein.

DESCRIPTION OF THE PREFERRED EMBODIMENTS

Figure 1:
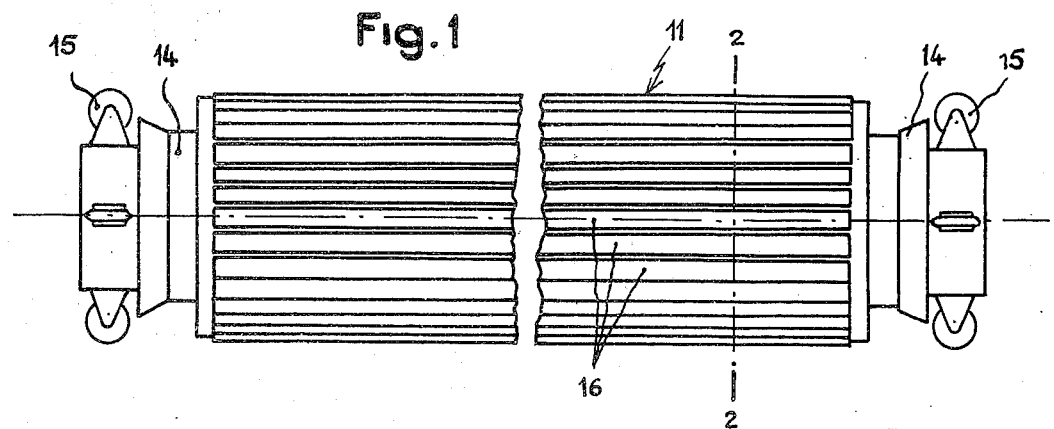
FIG. 1 is an elevational view of a first embodiment of a shaping mandrel according to the invention.
Figure 2:
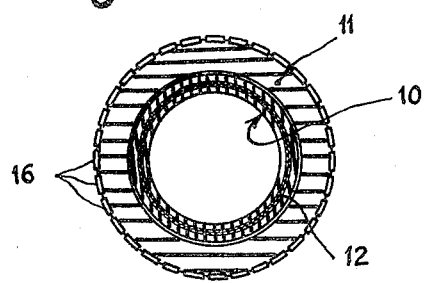
FIG. 2 is a transversal sectional view taken along the line 2—2 of FIG. 1.

In the embodiment of FIGS. 1 and 2, the shaping mandrel comprises a central expansible tube 10 and an outer cylindrical sleeve 11 which is removable with respect to the tube 10.

The tube 10 and the outer cylindrical sleeve 11 are made from a rubbery mixture of the kind used for common rubber items, such as tires, tubes or rubber belts and comprising a commercial elastomer such as natural or synthetic rubber, like the butadiene-styrene rubber called SBR, cis-polybutadiene, synthetic polyisoprene, neoprene or butyl. The base elastomer is mixed with a reinforcing charge such as carbon black and with suitable vulcanizing mediums, like sulfur. Tube 10 and sleeve 11 are reinforced (as described later in more detail) by means of layers or sheets of metal cables like the cables used in common, previously cited rubber items, and with the goal of obtaining a good adhesion between the metal cables and the rubber substance of the tube and of the sleeve, the rubbery mixture used should advantageously contain a medium of adhesion such as a cobalt salt or another medium of adhesion well known by the specialists in the fabrication of these rubber items.

As usual, the sheets of reinforcing metal cables are previously coated with a fine layer of this rubbery mixture; for example, by calendering from these sheets before using them for the manufacture of the tube and of the outer cylindrical sleeve.

The tube 10 comprises a cylindrical rubber wall internally reinforced with at least one pair of layers 12 consisting of parallel metal cables, said layers being in an arrangement wherein the cables run in inclined directions and the cables in one layer are crossed with those in the other layer. The directions of the metal cables form angles of 10° – 45° with respect to the longitudinal axial direction of the tube. The value of the angle of inclination of the cables in each layer is selected as a function of the degree of expansion to be obtained. Of the low angles providing increased expansion possibilities, it is possible to select, for example, angles on the order of about 15° – 20° for the cables in the layers 12. The cables can each comprise from 30 to 40 elementary metal fibers re-twisted together, the cable presents a diameter on the order of from 1 to 1.5 mm.

The ends of the central tube 10 are secured to metal closing elements or couplings 14 to provide a mandrel assembly. At least one of the elements 14 comprises a connection for the attachment of an inflation pipe for supplying fluid to the assembly. These elements 14 also bear small rollers 15 facilitating the translational movement of the mandrel assembly in the pipeline to be shaped when the mandrel is in its connected position.

The outer sleeve 11 is a thick-walled rubber sleeve having an inner diameter substantially equal to the outer diameter of the central tube 10 in the non-inflated state with merely the necessary radial play to enable the outer sleeve to engage about the central tube. The sleeve 11 is provided with the maximum possible thickness so as to reduce the diameter of the expansible tube 10 and thus reduce the axial stresses exerted on the elements 14 when the tube is under pressure but this thickness must remain within reasonable limits to restrict the inertia of the sleeve to the movements of expansion and contraction. For example, the thickness of the sleeve may be from 40 to 80 mm. This sleeve 11 is approximately the same length as the tube 10 and it is covered on its outer surface with longitudinal steel plates or bars 16. These plates have a cross-section of 15 × 4 mm. for the small sleeves to 15 inches in diameter and 22 × 6 mm. for the sleeves of 20 inches or more in diameter. These plates are flexible to enable them to follow the longitudinal curve adopted by the pipeline during the shaping operation. They are disposed side by side in a virtually contiguous manner to form about the sleeve a practically continuous surface in the circumferential direction or spaced apart from 1 to 10 mm. They are also embedded in the rubber forming the sleeve, for example, up to half the thickness of the plates and they are bonded to the rubber during vulcanization of the rubber forming the wall of the sleeve. Also these plates are cleaned and coated with a commercial binding material (Chemosil) to obtain a good adhesion to the rubber at the moment of vulcanization of the sleeve.

This covering of plates enables the apparatus to efficiently support the wall of the pipe in the longitudinal direction during the shaping operation and thus to prevent any wrinkling of this wall. However, the longitudinal plates may become spaced apart from each other during expansion of the sleeves 11 when the central tube 10 is placed under pressure. During successive shaping operations, when the sleeve has been deflated so as to have contracted, the metal plates forming a covering can easily slide on the inner surface of the pipe during the relative displacement of the mandrel in the pipe.

Figure 3:
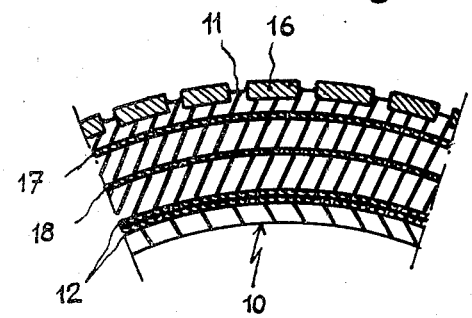
FIG. 3 is a partial transversal section taken along the line 3—3 of another embodiment of a mandrel.
Figure 4:
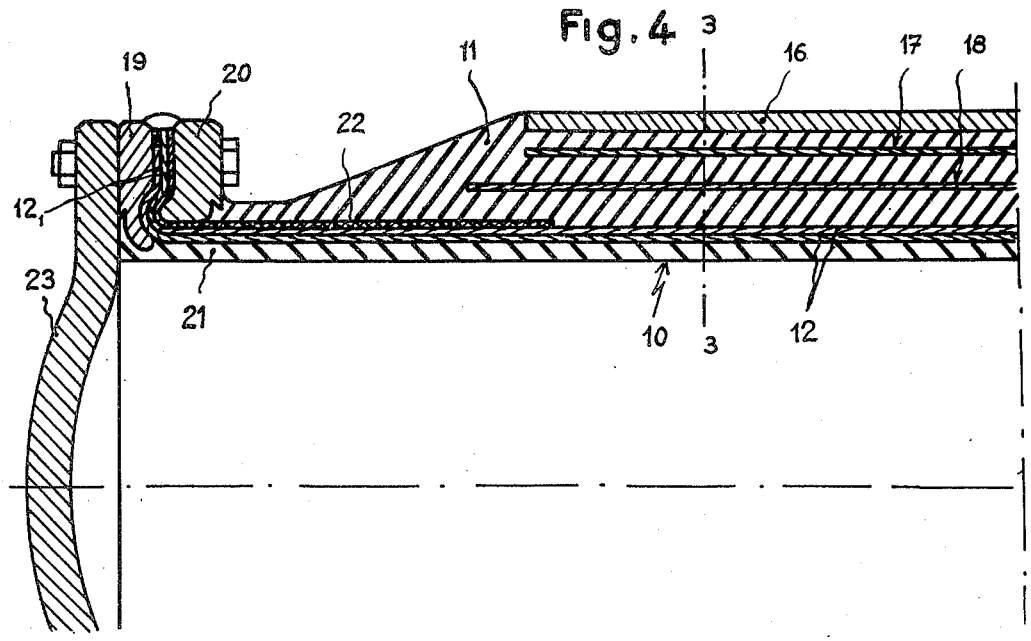
FIG. 4 is a partial longitudinal sectional view of the mandrel shown in FIG. 3.

In the case of FIGS. 3 and 4, the expansible mandrel forms a single assembly in which the sleeve 11 is combined with the tube 10 and is integral with this tube. As in the preceding embodiment, the latter is provided with at least one pair of layers of rubber coated metal cables 12 wherein the metal cables are crossed from one layer to the other and inclined according to low angles on the order of 15°–20° with respect to the axial longitudinal direction of the tube. In addition, the outer bearing surface of the sleeve against the pipe is covered with a system of flexible, longitudinal steel plates 16 which adhere to the rubber part of the sleeve 11.

In the case of the above-described two embodiments, when the mandrels in question have a large diameter, it is advantageous to reinforce the rubber sleeve of the mandrel with layers or with groups of additional metal cables embedded in rubber. In the embodiment represented, there are two additional layers 17–18, both spaced apart from each other and from the layers 12 and the plates 16. The spaced disposition of the reinforcing layers 17–18 increases the resistance to buckling of the mandrel assembly so that it forms a support which firmly braces the walls of the pipe to be shaped and resists any wrinkling of this wall. However, to avoid seriously reducing the ability of the mandrel to expand when it is under pressure, the cables of the reinforcing layers 17–18 are preferably oriented according to directions forming a slightly smaller angle, for example, by 5°, than the angle formed by the cables of the inner layers 12.

FIG. 4 also shows the construction of the ends of the mandrel which enable it to withstand the high pressures which will have to be employed when it is inflated, particularly when it is used to shape pipes having a wide or large diameter. Before vulcanization of the rubber in the mandrel, the ends $12_1$ of the inner rubber-coated bracing layers 12 are radially spread out so as to be engaged between the two elements 19 and 20 of a clamp capable of fitting one in the other while the inner rubber sheath 21 of the tube is extended below the clamp. An additional partial layer 22 which is also held between the two elements of the clamp and which extends as far as the thick part of the mandrel may also be connected to the ends $12_1$ of the layers 12. This additional layer 22 also consists of rubber-coated metal cables preferably directed longitudinally. During vulcanization of the mandrel, the two elements of the clamp are gripped by bolts parallel to the axis so as to obtain, during vulcanization, bonding between the rubber coating the layers $12_1$ and 22 with the metal elements 19–20 of the clamp. A base 23 closing the corresponding end of the mandrel is then mounted on the clamp by means of bolts.

Given the above arrangement, to shape a section of pipe, the mandrel is first introduced into the pipe in the contracted state. The mandrel is then inflated, preferably with a liquid, to cause it to expand and to bring its outer surface comprising the metal plates into contact with the inner wall of the pipe. This inflating process is continued to increase the internal pressure within the mandrel and the application pressure of the mandrel on the pipe so that this mandrel forms a support which is resistant to undesirable localized deformations of the pipe during the shaping operation. The internal pressure of the mandrel can thus be raised to about 20 bars. After the shaping operation, the pressure is released to produce the elastic contraction of the mandrel by the combined readjusting action of the rubber and the metal cables in the bracing layers. The mandrel is thereafter displaced axially to bring it into a new shaping position. The shaping of the pipe is thus effected in successive shaping operations between which the time taken to increase and decrease the pressure in the mandrel constitutes lost time and it is desirable to reduce this time as far as possible.

According to the present invention, this lost time can be reduced by increasing the angles of inclination of the cables in the bracing layers 12 of the tube 10, for example, to about 30°– 45° with respect to the longitudinal axis, and by providing the reinforcing layers 17 and 18 of the sleeve 11 with slightly smaller corresponding angles of inclination (about 25°–40°). It has been found that when the cables in the bracing layers have these angles of inclination, the mandrel does not begin to expand until reaching a relatively high pressure close to the bearing pressure required for the shaping operation. For example, a mandrel of this type does not begin to expand until reaching an inflation pressure of 15 bars; the pressure required for the shaping operation being 20 bars. Thus, to pass from one shaping operation to the subsequent operation, it suffices to reduce the pressure in the mandrel by only 5 bars to obtain contraction of the mandrel enabling it to be axially displaced and positioned for the subsequent shaping operation. In addition, once the mandrel has been placed in position, the pressure only has to be raised from 15 bars to 20 bars to obtain the necessary expansion and gripping force of the mandrel in the pipe. Accordingly, with this type of mandrel construction, it is possible to reduce the time required to increase and reduce the pressure, that is, to reduce the time which is lost between the successive shaping operations while obtaining the requisite high pressure during the shaping operation.

Figure 5:
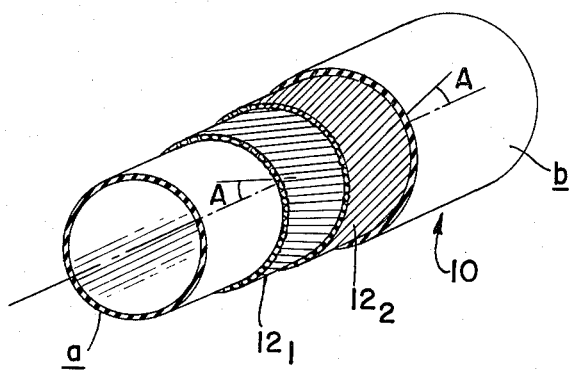
FIG. 5 is a perspective of a central expansible tube of the invention with a section arranged in varied layers.

To illustrate the arrangement of the layers of cables, within tube 10 FIG. 5 is provided. The manufacture of this tube 10 is very similar to the classic manufacture of tubes of reinforced rubber. On a cylindrical core, a non-vulcanized layer of rubber *a* is wound, and then a layer or sheet 12' of parallel metal cables covered in rubber is applied, the cables of this layer being arranged at an angle A with respect to the axis (or to the generatrices) of the cylinder. A second similar layer or sheet 12" is then superposed on the first, its cables being arranged in the other direction with an angle A of the same amount. Then the layer 12" is covered with the layer of rubber *b*. The layers 12' and 12" are therefore simply superposed prior to vulcanization.

It will be understood that the layers 17 and 18 of the mandrel shown in FIG. 4 are similar to the layers 12' and 12" except for the fact that they are spread apart from each other and separated by an intermediary layer of rubber and for the fact that the angles of inclination A of the cables in relation to the generatrices are a little different as heretofore described.

Figure 6:
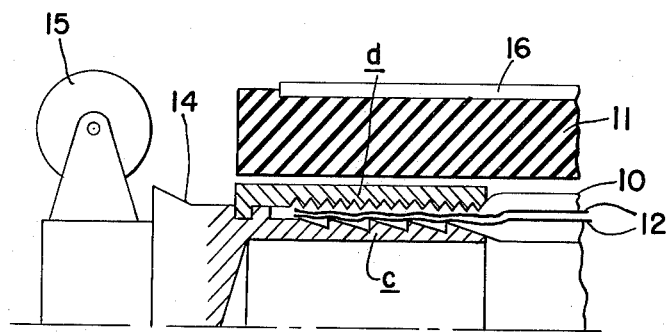
FIG. 6 is a detailed illustration of one end portion of the mandrel shown in FIG. 1.

In FIG. 6 the seating of the extremities of tube 10 on the connecting elements of coupling 14 are illustrated. These connecting elements include a male part *c*, provided externally with notches, which is sunk in the tube 10, and a female casing *d*, with interior notches, which is hammered out to hold the extremity of the tube against the male part. This system of connection is well recognized in the field of coupling connections of rubber tubes to internal reinforcements.

While the novel embodiments of the invention have been described, it will be understood that various omissions, modifications and changes in these embodiments may be made by one skilled in the art without departing from the spirit and scope of the invention.

What is claimed is:

1. An expansible mandrel for curving into the desired shape large-diameter metal pipes which are used, for example, to convey petroleum products comprising a central expansible tube having a rubber wall braced with at least one pair of layers comprising metal cables crossed from one layer to the other and inclined at an angle of about 10° to 45° with the longitudinal axis of the tube and a thick cylindrical rubber sleeve externally covered with flexible longitudinal extending plates adhering to the rubber of the sleeve arranged around said tube, said sleeve also comprises at least one pair of reinforcing layers comprising metal cables oriented in cross directions and forming a slightly smaller angle than the angle of the cable in the inner bracing layers of the expansible tube.

2. The mandrel of claim 1, wherein the metal cables in the bracing layers of the expansible tube are inclined at an angle of 30° to 50° with respect to the longitudinal axis and the metal cables in the reinforcing layers of the sleeve are inclined at an angle of 25° to 40° with respect to the longitudinal axis.

3. The mandrel of claim 1, wherein the reinforcing layers of the sleeve are spaced apart from each other and from the outer and inner surfaces of the mandrel.

4. The mandrel of claim 1, wherein the rubber sleeve is connected to the expansible tube and integral therewith.

5. The mandrel of claim 1, wherein the ends of the inner bracing layers of the expansible tube are spread out in a radial direction and gripped axially between two elements fitting one into the other of an annular end clamp to which a pressure-resistant metal base is attached.

6. The mandrel of claim 5, wherein an additional partial layer consisting of metal cables is connected to the ends of the bracing layers of the expansible tube, all the layers of metal cables in said tube being gripped between the elements of the end clamp of the mandrel.

* * * * *